(12) United States Patent
Bertoni et al.

(10) Patent No.: US 8,381,267 B2
(45) Date of Patent: Feb. 19, 2013

(54) METHOD OF PROCESSING INFORMATION TO BE CONFIDENTIALLY TRANSMITTED

(75) Inventors: Guido Marco Bertoni, Carnate (IT); Pasqualina Fragneto, Milan (IT); Gerardo Pelosi, Matera (IT); Keith Harrison, Chepstow Monmouthshire (GB); Liqun Chen, Bristol (GB)

(73) Assignee: STMicroelectronics S.r.l., Agrate Brianza (IT)

( * ) Notice: Subject to any disclaimer, the term of this patent is extended or adjusted under 35 U.S.C. 154(b) by 880 days.

(21) Appl. No.: 11/548,251

(22) Filed: Oct. 10, 2006

(65) Prior Publication Data

US 2007/0244944 A1 Oct. 18, 2007

(30) Foreign Application Priority Data

Oct. 11, 2005 (EP) .................................... 05425713

(51) Int. Cl.
H04L 29/06 (2006.01)
(52) U.S. Cl. .............................. 726/4; 713/168; 713/169
(58) Field of Classification Search .................. 726/3–4; 380/28–30
See application file for complete search history.

(56) References Cited

U.S. PATENT DOCUMENTS

| | | | |
|---|---|---|---|
| 6,243,467 B1 * | 6/2001 | Reiter et al. ..................... 380/30 |
| 6,666,381 B1 * | 12/2003 | Kaminaga et al. ............. 235/492 |
| 6,876,745 B1 * | 4/2005 | Kurumatani ..................... 380/28 |
| 7,991,162 B2 * | 8/2011 | Longa et al. ................... 380/282 |
| 8,045,705 B2 * | 10/2011 | Antipa et al. ..................... 380/28 |
| 8,111,826 B2 * | 2/2012 | Takashima ....................... 380/28 |
| 8,139,765 B2 * | 3/2012 | Ghouti et al. .................... 380/28 |
| 8,165,287 B2 * | 4/2012 | Ghouti et al. .................... 380/28 |
| 8,170,203 B2 * | 5/2012 | Ghouti et al. .................... 380/28 |
| 2002/0044649 A1 * | 4/2002 | Gallant et al. .................. 380/30 |
| 2003/0068037 A1 | 4/2003 | Bertoni et al. |
| 2003/0123668 A1 * | 7/2003 | Lambert et al. ............... 380/277 |
| 2007/0180241 A1 * | 8/2007 | Chen et al. .................... 713/168 |
| 2011/0060909 A1 * | 3/2011 | Brown et al. .................. 713/170 |
| 2012/0027210 A1 * | 2/2012 | Takeuchi et al. .............. 380/255 |
| 2012/0163588 A1 * | 6/2012 | Kobayashi et al. ............. 380/28 |

OTHER PUBLICATIONS

Boneh, D. et al., "Identity-Based Encryption from the Weil Pairing," SIAM J. of Computing, vol. 32, No. 3, pp. 586-615 (2003).
Eisentrager, K. et al., "Fast Elliptic Curve Arithmetic and Improved Weil Pairing Evaluation," Springer-Verlag Berlin Heidelberg, CT-RSA 2003, LNCS 2612, pp. 343-354 (2003).

(Continued)

Primary Examiner — Eleni Shiferaw
Assistant Examiner — Phy Anh Vu
(74) Attorney, Agent, or Firm — Seed IP Law Group PLLC

(57) ABSTRACT

A method of processing information to be confidentially transmitted from a first module to a second module provides that a first scalar multiplication may be carried out in order to obtain a first result [r]P. This first scalar multiplication comprises a plurality of generation steps of ordered factors from which a plurality of first partial sums are required to be built. The method also comprises the carrying out of a second scalar multiplication in order to obtain a second result. This second multiplication provides that a plurality of second partial sums may be built. A piece of encrypted information is obtained by processing the information based on the results of the scalar multiplications. The second partial sums of the second scalar multiplication use the same ordered factors obtained by the generation step of the first scalar multiplication.

25 Claims, 6 Drawing Sheets

OTHER PUBLICATIONS

Malone-Lee, J., "Identity-Based Signcryption," Report 2002/098, Cryptology ePrint archive, pp. 1-8.

Nalla, D. et al., "Signcryption scheme for Identity-based Cryptosystems," Report 2003/044, Cryptology ePrint archive, pp. 1-10.

Zhang, F. et al., "ID-Based One Round Authenticated Tripartite Key Agreement Protocol with Pairings," Report 2002/122, Cryptology ePrint archive, pp. 1-12.

Boneh and Franklin, "Identity Based Encryption from the Weil Pairing," CRYPTO 2001, LNCS 2193, pp. 213-229, 2001.

* cited by examiner

METHOD OF PROCESSING INFORMATION TO BE CONFIDENTIALLY TRANSMITTED

BACKGROUND OF THE INVENTION

1. Field of the Invention

The present invention relates to communication protocols among modules, for example, of the electronic type. Particularly, the invention relates to a method of processing information which can be employed, preferably though not exclusively, in the protocols ensuring a safe communication among these modules.

2. Description of the Related Art

As it is known, the need for making a transmission either of information or data of any nature safe among modules either of the hardware (for example, electronic devices) or software types communicating with one another is felt more and more, within the scope of the Information Technology.

To this purpose, encryption techniques of the transmitted messages have been refined in order to scramble the latter for non-authorized people.

As it is known to those skilled in the art, the most advanced encryption techniques are based on mathematical schemes set in protocols of encrypted communication either based on the identity or of the IBE-type (Identity Based Encryption).

Moreover, the interest in the mathematical schemes being applied to elliptical curves, such as for example the schemes based on a pairing is growing within the scope of these encryption protocols. Particularly, the most employed pairing is the Tate's one.

As it is known, in accordance with some protocols based on the identity, in order to safely transmit data that we have indicated with M from a first module A to a second module B, there is provided the carrying out of two subsequent operations by the first module A.

A first operation is a scalar multiplication which is carried out on a point of an elliptical curve by a random integer generated by module A.

A second operation provides that a known pairing function, for example, the Tate's pairing is calculated.

At this point, the data M to be transmitted are processed by the first module A by means of this pairing function and are transmitted to the second module B together with the result of the scalar multiplication.

The second module B may re-ascend the data M being sent by means of a private key of the latter, starting from the information received by the first module A.

It shall be noted that the method for cryptographically transmitting information based on the calculation, in succession, of a scalar multiplication and a pairing function requires onerous processing in terms of computing for the modules being involved in the communication. Thereby, the encryption operation is made slower.

BRIEF SUMMARY OF THE INVENTION

One embodiment of the present invention is a method for processing information which is improved compared to the known methods.

One embodiment of the invention is a method of processing information to be confidentially transmitted from a first module to a second module. The method includes carrying out a first scalar multiplication in order to obtain a first result; carrying out a second scalar multiplication in order to obtain a second result; and processing the information based on the first and second results in order to obtain an encrypted information. The first scalar multiplication includes: generating a plurality of ordered factors; and calculating a plurality of first partial sums each based on a corresponding one of the ordered factors, respectively. The second scalar multiplication includes calculating a plurality of second partial sums each based on a corresponding one of the ordered factors, respectively.

In one embodiment, a method of processing information to be confidentially transmitted from a first module to a second module comprises the steps of: carrying out a first scalar multiplication in order to obtain a first result, said first scalar multiplication including: generating a plurality of ordered factors; and calculating a plurality of first partial sums each based on a corresponding one of the ordered factors, respectively; carrying out a second scalar multiplication in order to obtain a second result, said second scalar multiplication including calculating a plurality of second partial sums each based on a corresponding one of the ordered factors, respectively; and processing said information based on the first and second results in order to obtain an encrypted information. In one embodiment, the second scalar multiplication is carried out between a point of an elliptical curve and a positive integer indicative of an order of a point of the curve and wherein the first scalar multiplication is carried out between the point and a random integer generated by the first module. In one embodiment, generating the plurality of ordered factors includes generating a first ordered factor, and generating a subsequent, second ordered factor by doubling the first ordered factor, the first ordered factor being coincident with the point of the elliptical curve. In one embodiment, the first and second scalar multiplications comprise the steps of: representing, from the first module, said random integer and said positive integer by sequences of bits in order to obtain a first and second binary numbers, respectively; carrying out a simultaneous reading of a first bit of said first binary number and a first bit of said second binary number, said first bits being a least significant bit in their respective binary numbers; verifying whether the first bits of the first and second binary numbers are a first logic value; building the first and second partial sums in response to verifying that the first bits of the first and second binary numbers are the first logic value; repeating the carrying out, verifying, and building steps for each bit of the first and second binary numbers. In one embodiment, the first and second partial sums using the least significant bits of the first and second binary numbers coincide with said first ordered factor. In one embodiment, the first and second partial sums using respective bits of the binary numbers following the least significant bits are calculated by adding the ordered factor generated for the respective bits of the binary numbers following the least significant bits to the partial sums for the least significant bits. In one embodiment, the building step comprises the further step of evaluating a first intermediate function referring to a pairing function. In one embodiment, the pairing function is Tate's pairing. One embodiment has a cost in terms of computing equal to:

$$COST_{(P,Q)+[r]P} = \lfloor \log_2 m \rfloor + hw(m) + hw(r) + COST f_v$$

with: $\lfloor \log_2 m \rfloor$ being a smallest integer included in the $\log_2 m$; $hw(m)$ being the number of partial sums calculated from the reading of the second binary number, wherein $hw(m)$ is the number of bits of the second binary number having the first logic value; $hw(r)$ being the number of partial sums calculated from the reading of the first binary number wherein $hw(r)$ is the number of bits of the first binary number having the first logic value; $COST f_v$ being the cost in terms of computing for the verifying steps. In an embodiment, the method comprises the step of generating a dynamic numerical base from said second binary number, said dynamic base being being valued by an expression:

$$B_m = \{2^i \qquad \text{with } 0 \leq i \leq N-1-d_{h-2}$$
$$2^i(2^{(N-1)-(d_{h-2})} + 1) \qquad \text{with } 0 \leq i \leq d_{h-2} - d_{h-3}$$
$$2^i(2^{(d_{h-2})-(d_{h-2})}(2^{(N-1)-(d_{h-2})} + 1) + 1) \qquad \text{with } 0 \leq i \leq d_{h-3} - d_{h-4}$$
$$\ldots$$
$$2^{d_i}(\ldots (2^{d_{h-3}-d_{h-2}}(2^{N-1-d_{h-2}} + 1) + 1) \ldots ) + 1\}$$

said dynamic base allowing a re-coding of the first binary number to be carried out in order to obtain a re-coded number. In an embodiment, the method further comprises carrying out further first and further second scalar multiplications by: carrying out a simultaneous reading of one most significant bit of said second binary number and one least significant bit of said re-coded number; generating a third ordered factor for said most significant bit read, said third ordered factor being equal to the point of the elliptical curve; building the first partial sum for said most significant bit and the second partial sum for said least significant bit of said re-coded number following a verification that said most significant bit and said least significant bit of said re-coded number have the first logic value; repeating the carrying out, generating, and building steps for each bit of the second binary number and the re-coded number, wherein repeating the generating step includes generating ordered factors subsequent to said third ordered factor either by adding the point to a previous one of the ordered factors or by doubling said previous ordered factor. In an embodiment, the first and second modules are both electronic devices.

In an embodiment, a system for processing information comprises: first scalar multiplication means for carrying out a first scalar multiplication in order to obtain a first result, said first scalar multiplication including: generating means for generating a plurality of ordered factors; and means for calculating a plurality of first partial sums each based on a corresponding one of the ordered factors, respectively; second scalar multiplication means for carrying out a second scalar multiplication in order to obtain a second result, said second scalar multiplication means including means for calculating a plurality of second partial sums each based on a corresponding one of the ordered factors, respectively; and means for processing said information based on the first and second results in order to obtain an encrypted information. In an embodiment, the second scalar multiplication means carries out the second scalar multiplication between a point of an elliptical curve and a positive integer indicative of an order of a point of the curve and wherein the first scalar multiplication is carried out between the point and a random integer generated by the first module. In an embodiment, the generating means generate a first ordered factor, and generate a subsequent, second ordered factor by doubling the first ordered factor, the first ordered factor being coincident with the point of the elliptical curve. In an embodiment, the first and second scalar multiplication means include: means for representing said random integer and said positive integer by sequences of bits in order to obtain a first and second binary numbers, respectively; means for carrying out a simultaneous reading of a first bit of said first binary number and a first bit of said second binary number, said first bits being a least significant bit in their respective binary numbers; means for verifying whether the first bits of the first and second binary numbers are a first logic value; means for building the first and second partial sums in response to verifying that the first bits of the first and second binary numbers are the first logic value; and means for repeating the carrying out, verifying, and building for each bit of the first and second binary numbers. In an embodiment, the first and second partial sums using the least significant bits of the first and second binary numbers coincide with said first ordered factor. In an embodiment, the first and second partial sums using respective bits of the binary numbers following the least significant bits are calculated by adding the ordered factor generated for the respective bits of the binary numbers following the least significant bits to the partial sums for the least significant bits. In an embodiment, the system comprises means for generating a dynamic numerical base from said second binary number, said dynamic base being being valued by an expression:

$$B_m = \{2^i \qquad \text{with } 0 \leq i \leq N-1-d_{h-2}$$
$$2^i(2^{(N-1)-(d_{h-2})} + 1) \qquad \text{with } 0 \leq i \leq d_{h-2} - d_{h-3}$$
$$2^i(2^{(d_{h-2})-(d_{h-2})}(2^{(N-1)-(d_{h-2})} + 1) + 1) \qquad \text{with } 0 \leq i \leq d_{h-3} - d_{h-4}$$
$$\ldots$$
$$2^{d_i}(\ldots (2^{d_{h-3}-d_{h-2}}(2^{N-1-d_{h-2}} + 1) + 1) \ldots ) + 1\}$$

said dynamic base allowing a re-coding of the first binary number to be carried out in order to obtain a re-coded number. In an embodiment, the system further comprises means for carrying out further first and further second scalar multiplications by: carrying out a simultaneous reading of one most significant bit of said second binary number and one least significant bit of said re-coded number; generating a third ordered factor for said most significant bit read, said third ordered factor being equal to the point of the elliptical curve; building the first partial sum for said most significant bit and the second partial sum for said least significant bit of said re-coded number following a verification that said most significant bit and said least significant bit of said re-coded number have the first logic value; repeating the carrying out, generating, and building steps for each bit of the second binary number and the re-coded number, wherein repeating the generating step includes generating ordered factors subsequent to said third ordered factor either by adding the point to a previous one of the ordered factors or by doubling said previous ordered factor.

In an embodiment, a computer-readable medium comprises code that, when loaded into a memory of a computer, causes the computer to process information to be confidentially transmitted from a first module to a second module by a method that includes: carrying out a first scalar multiplication in order to obtain a first result, said first scalar multiplication including: generating a plurality of ordered factors; and calculating a plurality of first partial sums each based on a corresponding one of the ordered factors, respectively; carrying out a second scalar multiplication in order to obtain a second result, said second scalar multiplication including calculating a plurality of second partial sums each based on a corresponding one of the ordered factors, respectively; and processing said information based on the first and second results in order to obtain an encrypted information. In an embodiment, the second scalar multiplication is carried out between a point of an elliptical curve and a positive integer indicative of an order of a point of the curve and wherein the first scalar multiplication is carried out between the point and a random integer generated by the first module. In an embodiment, generating the plurality of ordered factors includes generating a first ordered factor, and generating a subsequent, second ordered factor by doubling the first ordered factor, the first ordered factor being coincident with the point of the elliptical curve. In an embodiment, the first and second scalar multiplications comprise the steps of: representing, from the first module, said random integer and said positive integer by sequences of bits in order to obtain a first and second binary numbers, respectively; carrying out a simultaneous reading of a first bit of said first binary number and a first bit of said second binary number, said first bits being a least significant bit in their respective binary numbers; verifying whether the first bits of the first and second binary numbers are a first logic value; building the first and second partial sums in response to verifying that the first bits of the first and second binary numbers are the first logic value; and repeating the carrying out, verifying, and building steps for each bit of the first and second binary numbers. In an embodiment, the first and second partial sums using the least significant bits of the first and second binary numbers coincide with said first ordered factor. In an embodiment, the first and second partial sums using respective bits of the binary numbers following the least significant bits are calculated by adding the ordered factor generated for the respective bits of the binary numbers following the least significant bits to the partial sums for the least significant bits. In an embodiment, the method includes generating a dynamic numerical base from said second binary number, said dynamic base being being valued by an expression:

$$B_m = \{2^i \quad \text{with } 0 \le i \le N-1-d_{h-2}$$
$$2^i(2^{(N-1)-(d_{h-2})} + 1 \quad \text{with } 0 \le i \le d_{h-2} - d_{h-3}$$
$$2^i(2^{(d_{h-2})-(d_{h-2})}(2^{(N-1)-(d_{h-2})} + 1) + 1) \quad \text{with } 0 \le i \le d_{h-3} - d_{h-4}$$
$$\ldots$$
$$2^{d_i}( \ldots (2^{d_{h-3}-d_{h-2}}(2^{N-1-d_{h-2}} + 1) +$$
$$1) \ldots ) + 1\}$$

said dynamic base allowing a re-coding of the first binary number to be carried out in order to obtain a re-coded number. In an embodiment, the method includes carrying out further first and further second scalar multiplications by: carrying out a simultaneous reading of one most significant bit of said second binary number and one least significant bit of said re-coded number; generating a third ordered factor for said most significant bit read, said third ordered factor being equal to the point of the elliptical curve; building the first partial sum for said most significant bit and the second partial sum for said least significant bit of said re-coded number following a verification that said most significant bit and said least significant bit of said re-coded number have the first logic value; repeating the carrying out, generating, and building steps for each bit of the second binary number and the re-coded number, wherein repeating the generating step includes generating ordered factors subsequent to said third ordered factor either by adding the point to a previous one of the ordered factors or by doubling said previous ordered factor.

BRIEF DESCRIPTION OF THE SEVERAL VIEWS OF THE DRAWINGS

The characteristics and the advantages of the present invention will be understood from the following detailed description of one exemplary and non-limiting embodiment thereof with regard to the annexed drawings, in which.

DETAILED DESCRIPTION OF THE INVENTION

It shall be noted that a method for processing information in accordance with one embodiment of the invention can be applied both to encryption protocols of this information based on the IBE identity (Identity Based Encryption) and to digital signature schemes.

Advantageously, this processing method can be applied, for example, to the IBE encryption scheme set by Boneh-Franklin in the document *Identity Based Encryption from the Weil Pairing*, SIAM J. Of Computing, vol. 32, No. 3, pp. 586-615, 2003, Cripto 2001, LNCS vol. 2193, Springer-Verlag 2001, pp. 213-229. Particularly, this method can be applied in the case where the encrypted information is transmitted to different scheme destinations each of which refers to a single trusted authority.

Furthermore, the processing method can be applied, for example, to the following encryption protocols: the encryption protocol set by John Malone-Lee in the document *Identity-Based Signcryption*, Report 2002/098, Cryptology ePrint archive, or to the one set by Divya Nalla e K. C. Reddy in the document *Signcryption scheme for Identity-based Cryptosystem*, Report 2003/044, Cryptology ePrint archive, or to the IBE authentication protocol set by F. Zhang, S. Liu, K. Kim in the document *ID-Based One Round Authenticated Tripartite Key Agreement Protocol with Pairings*, Report 2002/122, Cryptology ePrint archive.

The method provides that a processing of information may be carried out by a first module C following which a piece of information INFO can be cryptographically transmitted to a second module D.

It shall be noted that these first C and second D modules can be both hardware-type modules, i.e., electronic devices (for example, a mobile telephone, a smart card, a computer etc.), and software modules, i.e., sequences of instructions for a program.

Moreover, the method is based on mathematical schemes known to those skilled in the art and typical of the IBE protocol (Identity Based Encryption). These schemes provide:

a finite field or base field GF(q), i.e., a finite set of elements in which addition and multiplication operations are defined, q being an integer;

an extension field $GF(q^k)$, i.e., a finite field containing the base field GF(q);

an elliptical curve E defined on the base field GF(q).

Moreover, an odd positive integer m, co-prime with q, is defined so that the elliptical curve E contains an order point m. A number k is the smallest integer, thereby the ratio $m/(q^k-1)$ is an integer.

In addition, a first m-torsion subgroup E(GF(q))[m] of the points of an elliptical curve E defined on the base field GF(q) is defined.

Particularly, said positive integer m indicates the order of the subgroup E(GF(q))[m].

Similarly, a second m-torsion subgroup of the points of an elliptical curve E defined on the extension field $GF(q^k)$ has been indicated by $E(GF(q^k))[m]$.

Figure 1:
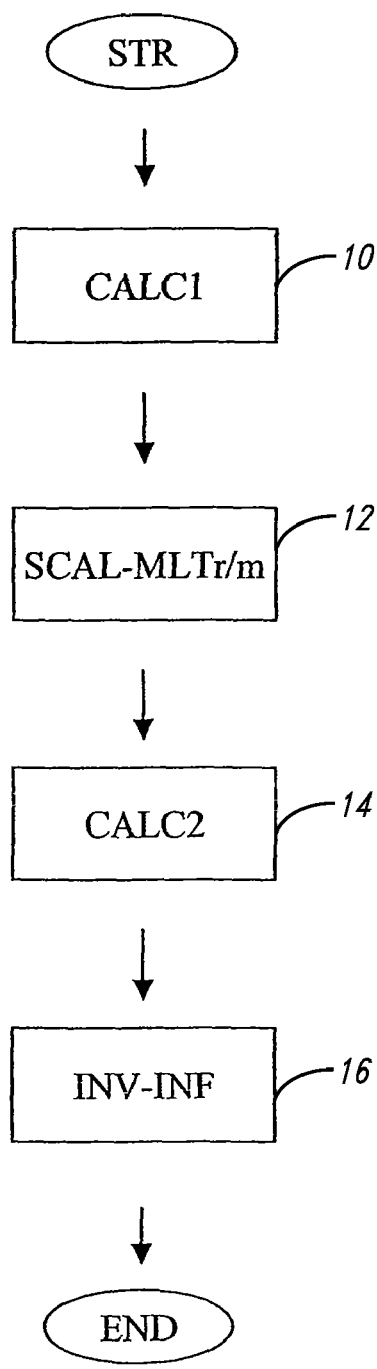
FIG. 1 schematically shows a flow diagram referring to a method for processing information according to one embodiment of the invention.

With reference to the flow diagram from FIG. 1, the method starts in step 10 from the acquisition of the information INFO (CALC1) which the first module C wants to cryptographically transmit to the second module D by means of encryption protocols based on elliptical curves.

To this purpose, as it is known to those skilled in the art, before the information INFO is encrypted and sent, the first module C calculates a first scalar multiplication and values a bilinear function. These steps have been indicated from 1 with SCAL-MLTr/m (step 12).

In greater detail, this first scalar multiplication involves a point P of the group of points of an elliptical curve E and a further random integer r. Said multiplication is carried out by adding the point P to the latter r times and has been indicated herein below with the notation [r]P.

For example, the calculation of the first scalar multiplication [r]P can be carried out from a binary representation of the random integer r, i.e.:

$$r = \sum_{j=0}^{t-1} r_j 2^j \quad (1)$$

and by expressing the result of the first scalar multiplication [r]P by:

$$[r]P = \left[\sum_{j=0}^{t-1} r_j 2^j\right] P = 2(\ldots 2(2[r_{t-1}]P) + [r_{t-2}]P) + \ldots) + [r_0]P \quad (2)$$

It shall be noted that the operation indicated in the expression (2) can be implemented by means of an algorithm known as the Double-and Add.

Moreover, the bilinear function that is evaluated by the first module C is defined either as a map or a pairing. This pairing has been, traditionally, indicated with the notation <.,.>. For example, a known bilinear function is the Tate's pairing which, being applied to a first point P1∈E(GF(q))[m] and a second point $Q \in E(GF(q^k))[m]$, may be expressed by:

$$<P1,Q> = f_{P1}(Q)^{[(q^k-1)/m]} \quad (3)$$

wherein $f_{P1}$ indicates a rational function having coefficients in the extension field $GF(q^k)$. Furthermore, the bilinear function <.,.> is applied to linearly independent m-torsion points so that this function does not take a trivial value, i.e., the unit.

Preferably, the processing method provides that the point P of the first scalar multiplication [r]P and the first point P1 of the Tate's pairing coincide with each other, i.e., P=P1∈E(GF(q))[m]. This equivalence is adopted herein below for the whole description.

Furthermore, the Tate's pairing function <P1,Q>=<P,Q> can be calculated by means of a Miller's algorithm known to those skilled in the art. Particularly, this Miller's algorithm is an iterative algorithm, substantially comprising the calculation of a second scalar multiplication [m]P similar to said first multiplication [r]P. This second multiplication [m]P is carried out between the positive integer m indicative of the order of the m-torsion subgroup E(GF(q))[m] and said point P.

In addition, Miller's algorithm also comprises the iterative valuation of intermediate functions $f_v$ (with v=1, 2, 3, ...). These intermediate functions $f_v$ contribute to determine the rational function $f_{P1}=f_P$ of the Tate's pairing (3) at the end of the iteration.

Figure 2A:
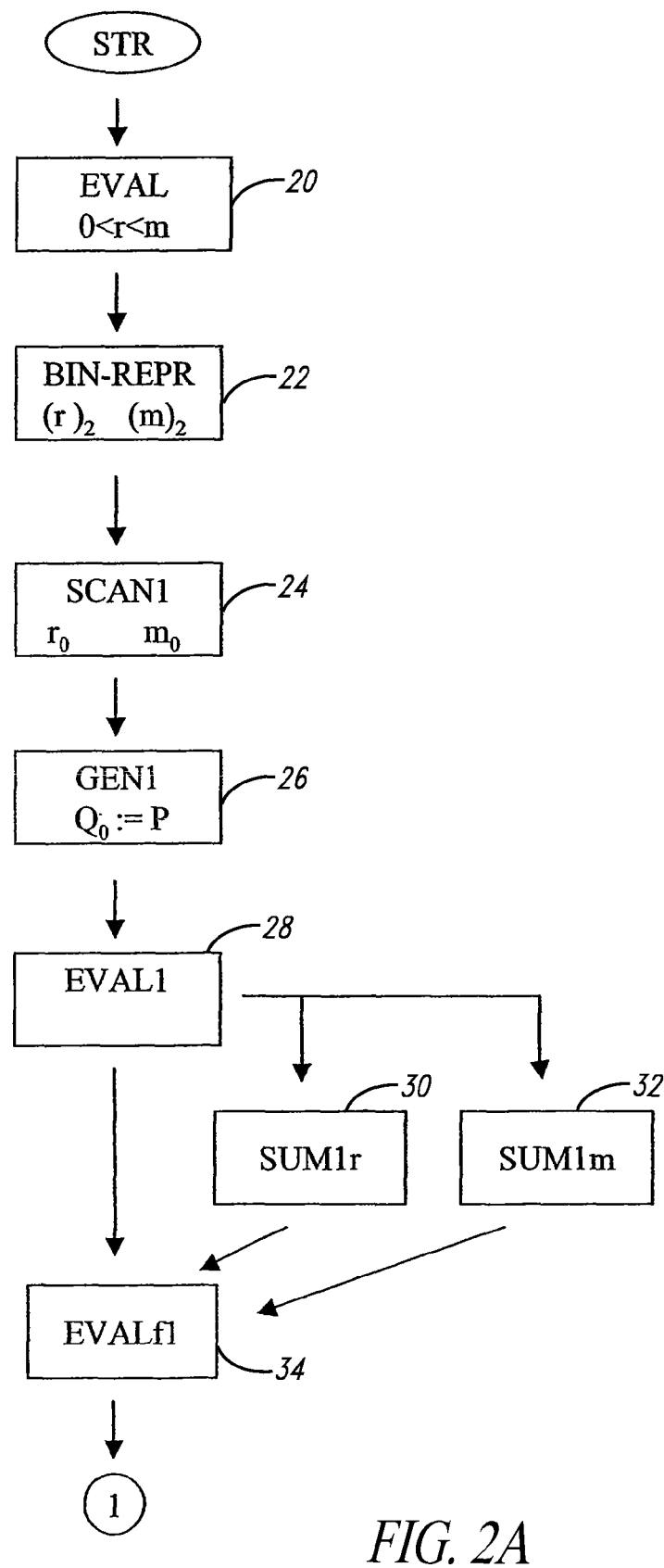
FIGS. 2A-C schematically show flow diagrams referring to steps of the processing method from FIG. 1.
Figure 2B:
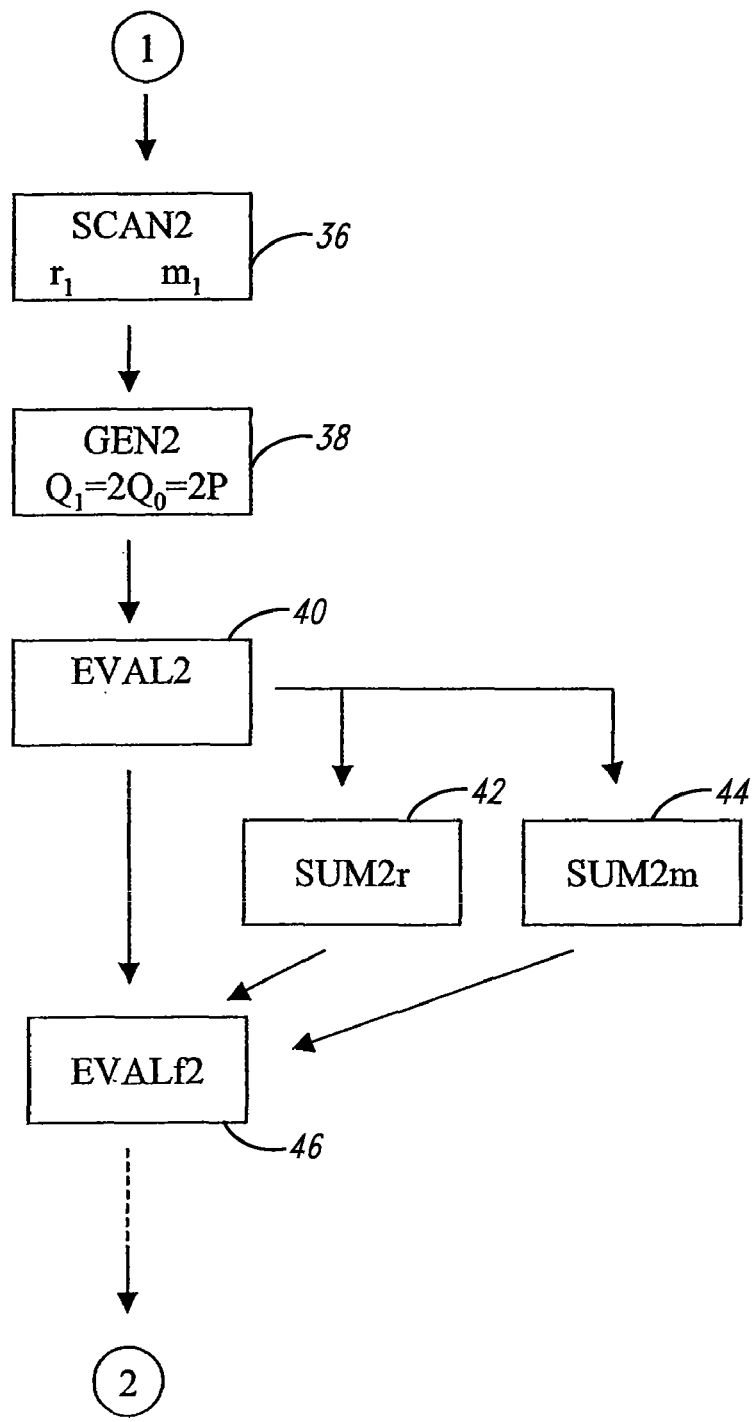
Figure 2C:
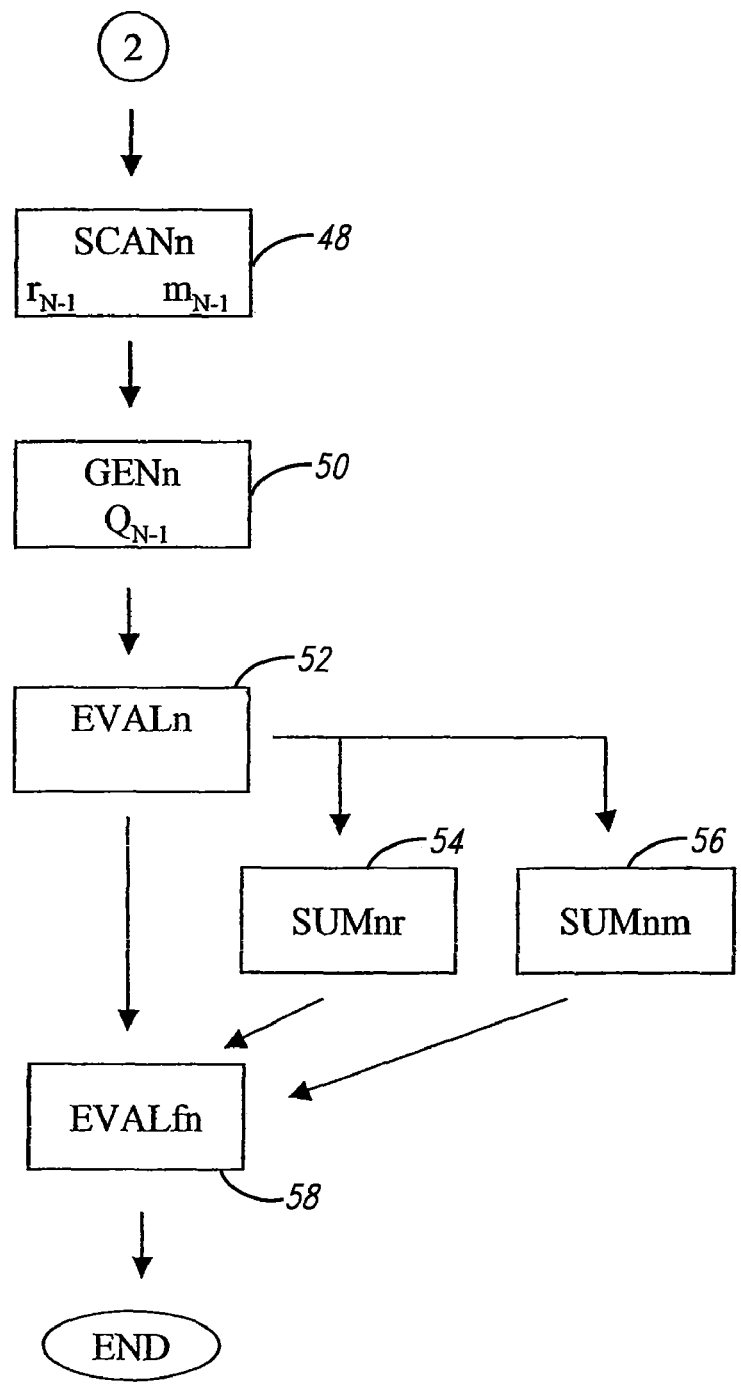

A preferred embodiment of the calculation step 12 of the first scalar multiplication [r]P and the valuation of the Tate's pairing <P,Q> (step SCAL-MLTr/m from FIG. 1) can be described with reference to FIGS. 2A-C.

In order to calculate the first scalar multiplication and, simultaneously, value the Tate's pairing <P,Q>, the first module C generates the further random integer r (EVAL step 20) so that the latter is smaller than the positive integer m, i.e.:

$$0 < r < m \quad (4)$$

In an initial step of the method, the positive integer m and the further random integer r are represented in binary notation (BIN-REPR step 22), i.e., by means of a sequence of N bits (bits 0 and 1). Thereby, first $(r)_2$ and second $(m)_2$ binary numbers corresponding to the random integer r and the positive integer m, respectively, are obtained. These binary numbers $(r)_2$ and $(m)_2$ can be expressed by:

$$(r)_2 = r_{N-1} \ldots r_1 r_0 \quad (5)$$

$$(m)_2 = m_{N-1} \ldots m_1 m_0 \quad (6)$$

wherein $r_0$ and $m_0$ are the least significant digits (or bits) of these binary numbers $(r)_2$ and $(m)_2$, whereas $r_{N-1}$ and $m_{N-1}$ are the most significant digits (or bits).

The method provides that said first $(r)_2$ and second $(m)_2$ binary numbers may have the same N number of bits. Therefore, given that 0<r<m, if the number of bits corresponding to the representation of the random integer r should be smaller than the number of bits being used for representing the positive integer m, the number of bits of the first binary number $(r)_2$ would be increased by adding one (or more) bits 0 in the positions of the sequence which refer to the most significant bits.

At this point, the first module C carries out a scanning, i.e., a bit-by-bit reading, of the first $(r)_2$ and second $(m)_2$ binary numbers. Particularly, the scanning of the first number $(r)_2$ is simultaneously carried out to the one of the second $(m)_2$ so that the bit taking the same position in the sequences of the two binary numbers are read during each step of the scanning. Moreover, this scanning is carried out from the right to the left, i.e., from the least significant bit ($r_0$ and $m_0$) to the most significant one ($r_{N-1}$ and $m_{N-1}$).

Following the scanning of the least significant bits $r_0$ and $m_0$ of the first $(r)_2$ and second $(m)_2$ binary numbers (SCAN1 step 24), the first module C generates a first ordered factor $Q_0$ which, particularly, corresponds to the pre-determined point P (GEN1 step 26).

In general, it shall be noted that, following the scanning of each bit of the first $(r)_2$ and second $(m)_2$ binary numbers, the first module C generates a respective ordered factor. Therefore, the number of the generated factors coincides with the overall N number of bits of $(r)_2$ (or $(m)_2$).

It shall be further noted that, in accordance with one embodiment of the invention, these ordered factors $Q_i$ (with i=1, 2, ..., N−1) are obtained by carrying out N−1 doubling operations starting from the first factor $Q_0$, i.e., each factor $Q_i$ is obtained by doubling the previous one. Thereby, a sequence $S_1$ of ordered factors is obtained, which can be expressed by:

$$S_1 -> Q_0=P, Q_1=2P, Q_2=4P ... Q_{N-1}=2^{(N-1)}P \quad (7)$$

After the first ordered factor $Q_0$ has been generated, the first module C evaluates whether the least significant bits $r_0$ and $m_0$ of the first $(r)_2$ and second $(m)_2$ binary numbers are 1 or 0 (EVAL1 step 28).

For example, if the least significant bit $r_0/m_0$ of the first/second binary number $(r)_2/(m)_2$ is 1, the first module C calculates a first partial sum $A_{1(r)}$ referring to the first binary number (SUM1r step 30) and a further first partial sum $A_{1(m)}$ referring to the second binary number (SUM1m step 32). Particularly, these first partial sums are calculated based on the relations:

$$A_{1(r)}=A_0+Q_0 \quad (8)$$

$$A_{1(m)}=A_0+Q_0 \quad (8')$$

wherein $Q_0=P$, whereas $A_0$ is traditionally fixed to the value 0. It shall be noted that (8) and (8') are partial sums of the Double and Add algorithm.

Furthermore, a subsequent step of the processing method provides that a first intermediate function $f_1$ of the Tate's (EVALf1 step 34) may be evaluated.

It shall be particularly noted that in the case where the least significant bit $r_0/m_0$ is equal to 0 the sum (8) and/or the sum (8') are not carried out, therefore it will be:

$$A_{1(r)}=A_0=0, A_{1(m)}=A_0=0$$

By proceeding with the scanning of the first/second binary number $(r)_2/(m)_2$, the module C calculates the second ordered factor $Q_1=2P$ of the sequence $S_1$ by doubling the first factor $Q_0=P$ (GEN2 step 38) at the bit $r_1/m_1$ (SCAN2 step 36).

At this point, if this bit $r_1/m_1$ is equal to 1 (EVAL2 step 40), a second partial sum is calculated for the first and second binary numbers (SUM2r and SUM2m steps 42, 44):

$$A_{2(r)}=A_{1(r)}+Q_1 \quad (9)$$

$$A_{2(m)}=A_{1(m)}+Q_1 \quad (9')$$

wherein $A_{1(r)}$ and $A_{1(m)}$ correspond to the partial sums being calculated in the previous step. Even in this case, if the bit $r_1/m_1$ is equal to 0, the sums (9) and (9') are not carried out and the value of the second partial sum $A_{2(r/m)}$ corresponds to the value of the sum in the previous step, i.e., $A_{1(r/m)}$.

Moreover, the second intermediate function $f_2$ (EVALf2 step 46) is valued.

The procedure is similarly carried out with all the bits of the first/second binary number $(r)_2/(m)_2$ up to the most significant bit $r_{N-1}/m_{N-1}$. Following the scanning of this bit (SCANn step 48) the first module C calculates the last intermediate datum $Q_{N-1}=2^{(N-1)}P$ (GENn step 50). In that case, if the bit $r_{N-1}/m_{N-1}$ is equal to 1 (EVALn step 52) the N-th partial sum $A_{N(r/m)}$ is calculated based on the sums (SUMnr and SUMnm steps 54, 56:

$$A_{N(r)}=A_{N-1(r)}+Q_{N-1} \quad (10)$$

$$A_{N(m)}=A_{N-1(m)}+Q_{N-1} \quad (10')$$

wherein $A_{N-1(r)}$ and $A_{N-1(m)}$ are the partial sums calculated in the (N−1)-th step. In the case where the most significant bits $r_{N-1}$ and $m_{N-1}$ are equal to 0, the N-th partial sums $A_{N(r)}$ and $A_{N(m)}$ take the value of the sums in the previous step, i.e., $A_{N-1(r)}$ and $A_{N-1(m)}$, respectively.

The N-th intermediate function $f_n$ (EVALfn step 58) is also valued.

In other words, following the bit-by-bit scanning of the first $(r)_2$ and second $(m)_2$ binary numbers the first module C calculates a first and second multiplicities of partial sums. Particularly, each partial sum is calculated at one bit 1 in the binary sequences of the numbers $(r)_2$ and $(m)_2$.

It shall be further noted that the N-th partial sum calculated for the first $(r)_2$ and second $(m)_2$ binary numbers corresponds to the result of the first [r]P and second [m]P scalar multiplications, respectively.

With reference to FIG. 1, after the scalar multiplications have been carried out in accordance with the step SCAL-MLTr/m, the processing method of the invention provides the encryption (CALC2 step 14) by the first module C of the information INFO to be transmitted by means of the calculated Tate's pairing function <P,Q>.

Finally, both the encrypted information and the result of the first scalar multiplication [r]P are sent by the first module C to the second module D (INV-INF step 16).

Advantageously, the partial sums referring to the first [r]P and second [m]P scalar multiplications can be calculated starting from the same ordered factors $Q_i$. In other words, the method allows the calculation of the first scalar multiplication [r]P and the one of the second multiplication [m]P to be simultaneously carried out. This considerably reduces the times of the processing being carried out by the first module C compared to the independent carrying out of each multiplication.

The cost in terms of computing to be given to the first module C both to calculate the first scalar multiplication [r]P and to value the Tate's pairing <P,Q> (by means of the Miller's algorithm) for said method can be expressed by:

$$COST_{<P,Q>+[r]P}=\lfloor \log_2 m \rfloor + hw(m) + hw(r) + COSTf_V \quad (11)$$

wherein:
$\lfloor \log_2 m \rfloor$ is the lowest integer contained in the $\log_2 m$. This lowest integer corresponds to the number of doubling operations required for building the sequence $S_1$ of ordered factors from the first factor $Q_0$;

hw(m) represents the number of partial sums calculated at the scanning of the second binary number $(m)_2$, hw(m) being the hamming weight of the positive integer m, i.e., the number of 1 bits present in the second binary number $(m)_2$;

hw(r) indicates the number of partial sums calculated at the scanning of the first binary number $(r)_2$, hw(r) being the number of 1 bits present in the first binary number $(r)_2$;

$COSTf_v$ is the cost in terms of computing required for the iterative valuation of the intermediate functions $f_v$.

For example, if it is assumed that the odd positive integer m=11 and the further random integer r=7, first of all, one embodiment of the invention provides that these decimal numbers may be converted into a binary base, i.e.:

$$(7)_{10}=1*2^2+1*2^1+1*2^0 \to (7)_2=111$$

$$(11)_{10}=1*2^3+1*2^1+1*2^0 \to (11)_2=1011$$

Given that the first binary number $(7)_2$ includes 3 bits, whereas the second number $(11)_2$ includes 4, the number of bits of the first number $(7)_2$ is increased by adding a digit 0 in the position of the most significant bit. Thereby, the binary numbers on which the method is carried out are:

$$(7)_2=0111$$

$$(11)_2=1011$$

Then, the first module C carries out the scanning of the first $(7)_2$ and second $(11)_2$ binary numbers from the least significant bit to the most significant one. Following the scanning of the least significant bits of these binary numbers $(7)_2$ and $(11)_2$, module C generates the first ordered factor $Q_0 = P$.

Given that the least significant bits of both the binary numbers $(7)_2$ and $(11)_2$ are equal to 1, module C calculates the first partial sum $A_{1(7/11)}$ referring to both the numbers, i.e.:

$$A_{1(7)} = A_{1(11)} = 0 + P = P$$

By proceeding with the scanning from the right to the left, the second bit of the binary numbers $(7)_2$ and $(11)_2$ is also 1. Therefore, after the second ordered factor $Q_1$, has been created, the first module C calculates for both the binary numbers the second partial sum $A_{2(7/11)}$:

$$A_{2(7)} = A_{2(11)} = P + 2P = 3P$$

The subsequent bits of the binary sequences of the first $(7)_2$ and second $(11)_2$ binary numbers are 1 and 0, respectively. Therefore, after the third intermediate datum $Q_2 = 4P$ has been valued, the third partial sum $A_{3(7)}$ referring to the first number $(7)_2$ is calculated:

$$A_{3(7)} = 3P + 4P = 7P,$$

whereas the third partial sum $A_{3(11)}$ referring to the second number $(11)_2$ is not calculated and is:

$$A_{3(11)} = A_{2(11)} = 3P.$$

Finally, the most significant bits of the first $(7)_2$ and second $(11)_2$ binary numbers are 0 and 1, respectively. Therefore, starting from the calculation from the last ordered factor $Q_3 = 8P$, the fourth partial sum $A_{4(7)}$ referring to the first number $(7)_2$ is not valued by taking the value of the previous partial sum, i.e.:

$$A_{4(7)} = A_{3(7)} = 7P,$$

whereas, the fourth partial sum referring to the second binary number $(11)_2$ is calculated by:

$$A_{4(11)} = 3P + 8P = 11P.$$

It shall be further noted that, in accordance with the Miller's algorithm, module C values at the partial sums $A_{1(11)}$, $A_{2(11)}$ and $A_{4(11)}$ their respective intermediate functions $f_1$, $f_2$, and $f_4$. On the other hand, the intermediate function $f_3$ corresponding to the third partial sum $A_{3(11)}$ is not calculated.

Advantageously, with regard to the described example the first module C calculates the first scalar multiplication $[7]P$ and values the Tate's pairing $<P,Q>$ (including the second multiplication $[11]P$) by carrying out a number of operations which is smaller than the ones required if the known processing methods should be employed. In fact, from the expression (11), for $r = 7$ and $m = 11$ the number of the overall operations to be carried out with the method, i.e., the cost in terms of computing of this method is:

$$COST_{<P,Q> + [r]P} = 3 \text{ (doubling)} + 3 \text{ (sums)} + 3 \text{ (sums)} + COST f_v$$

$$= 3 \text{ (doubling)} + 6 \text{ (sums)} + COST f_v.$$

Therefore, the operations for the first module C are: three doubling operations, six partial sums and the valuation of the intermediate functions $f_v$.

It shall be particularly noted that with the preferred embodiment of the method for processing information the number of required doubling operations is smaller than the one of the known methods. In fact, these latest known methods provide that two independence sequences of ordered factors may be calculated, one of which is used for calculating the first scalar multiplication $[r]P$, whereas the other one is used for calculating the second multiplication $[m]P$.

For example, for $r = 7$ and $m = 11$, with the known processing methods, the number of required doubling operations would be equal to five.

As it is known to those skilled in the art, in order to calculate the first scalar multiplication $[r]P$ with the Double-and-Add algorithm, the scanning of the first binary number $(r)_2$ may be also carried out from the most significant bit $r_{N-1}$ to the least significant one $r_0$, i.e., from the left to the right of the binary sequence. However, in this case, the calculation of the first multiplication $[r]P$ would be onerous from the computing viewpoint because the first module C should carry out a larger number of operations compared to the ones required for the scanning of the same number $(r)_2$ from the right to the left.

On the contrary, the calculation of the second scalar multiplication $[m]P$ being included in the Miller's algorithm would require a smaller number of calculations in the case where the scanning of the second binary number $(m)_2$ is carried out from the most significant bit $m_{N-1}$ to the least significant one $m_0$, i.e., from the left to the right. In this case, the carrying out of the Miller's algorithm would be faster.

Having said that, a further embodiment of the processing method provides that the first module C may carry out the scanning of the second binary number $(m)_2$ from the most significant bit $m_{N-1}$ to the least significant one $m_0$ (from the left to the right).

Moreover, in order to simultaneously carry out the scanning of the first binary number $(r)_2$ from the right to the left by making use of the advantage which this entails in terms of computing, the first module C provides for advantageously representing said first number $(r)_2$ in a new numerical base or dynamic base $B_m$.

Particularly, this dynamic base $B_m$ is generated from the binary representation of the odd positive integer m, i.e., from $(m)_2$. In fact, the positive integer m can be expressed by:

$$m = 2^{N-1} + 2^{d_{h-2}} + 2^{d_{h-2}} + \ldots + 2^{d_1} + 1 \qquad (12)$$

wherein the exponent $d_i$ indicates the position of the bits 1 within the binary sequence of m and the index h represents the hamming weight of the integer m.

From the expression (12), the dynamic base $B_m$ being function of the integer m can be expressed by:

$$B_m = \{2^i \qquad \text{with } 0 \leq i \leq N - 1 - d_{h-2} \quad (13)$$

$$2^i(2^{(N-1)-(d_{h-2})} + 1) \qquad \text{with } 0 \leq i \leq d_{h-2} - d_{h-3}$$

$$2^i(2^{(d_{h-2})-(d_{h-3})}(2^{(N-1)-(d_{h-2})} + 1) + 1) \qquad \text{with } 0 \leq i \leq d_{h-3} - d_{h-4}$$

$$\ldots$$

$$2^{d_1}(\ldots(2^{d_{h-3}-d_{h-2}}(2^{N-1-d_{h-2}} + 1) +$$

$$1)\ldots) + 1\}.$$

It shall be noted that the dimension w of the dynamic base $B_m$, i.e., the number of elements of this base is given by:

$$w = \lfloor \log_2(m) \rfloor + hw(m). \qquad (14)$$

Furthermore, given the positive integer m, the highest number which can be represented by means of the dynamic base $B_m$ being built from m is indicated by max_record. In this case, if the random integer $r \leq$ max_record, this number r can be represented as a linear combination of the elements of the dynamic base $B_m$, i.e.:

$$r = c_{w-1}b_{w-1} + \ldots + c_1 b_1 + c_0 b_0 \qquad (15)$$

wherein $c_i \in \{0, 1\}$ and $b_i \in B_m$.

In accordance with the equivalence (15), the random integer r may be re-coded by means of the dynamic base $B_m$ and this re-coding is indicated by re-cod(r) in order to be distinguished from the binary representation of the random integer r.

It shall be further noted that the relation (4) is also valid with reference to the second embodiment of the method. This means that in (15) is $c_{w-1}=0$.

For example, for r=7 and m=11, the further embodiment of the processing method can be described with reference to FIG. 3.

Particularly, this embodiment of the method provides, first of all, that the dynamic base $B_m=B_{11}$ (GEN $B_m$ step 70) may be generated from the first module C. This base $B_{11}$ is generated in accordance with (13) and from the scanning of the binary number $(11)_2$, i.e.

$$(11)_2 = m_3 m_2 m_1 m_0 = 1011$$

from the most significant bit $m_3$ to the least significant one $m_0$.

It shall be noted that in accordance with (13), the first element of the dynamic base $B_{11}$ (if this base is read from the right to the left) is always equal to 1. This first element is generated by the first module C following the scanning of the most significant bit $m_3=1$ of the binary number $(11)_2$.

Following the scanning of the bit $m_2=0$ of $(11)_2$, the first module C doubles the first element of the base $B_{11}$, so that the second element is equal to 2.

With the scanning of the subsequent bit $m_1=1$ of $(11)_2$, the first module C doubles the value of the previous element of the base (i.e., of the second equal to 2), thereby the third element of the base $B_{11}$ is equal to 4. Moreover, as the read bit $m_1=1$, the first module C generates the fourth element of the base $B_{11}$ by increasing this third element by one unit. After all, the fourth element of the base $B_{11}$ is equal to 5.

Similarly, following the scanning of the bit $m_0=1$ of $(11)_2$, the first module C doubles the previous element, i.e., the fourth being equal to 5. Therefore, the fifth element of the base $B_{11}$ is equal to 10.

Furthermore, given that the subsequent bit being read during the scanning of the number $(11)_2$ is $m_0=1$, the first module C generates the sixth element of the base $B_{11}$ by increasing the value of this fifth element by one unit. Thereby, the sixth element of the base $B_{11}$ is fixed to 11.

After all, the dynamic base generated by the first module C is:

$$B_{11} = \{11, 10, 5, 4, 2, 1\}.$$

It shall be noted that the random integer r=7 can be thus represented in this base $B_{11}$ by using known re-coding algorithms (RECODr step 72). For example, the following re-coding algorithm can be used:

| | |
|---|---|
| t = r − 11 = 7 − 11 ≥ 0 ? No -> then | re-cod(r) = [0xxxxx] |
| t = r − 10 = 7 − 10 ≥ 0 ? No -> then | re-cod(r) = [00xxxx] |
| t = r − 5 = 7 − 5 = 2 ≥ 0 ? Yes -> then r = t; | re-cod(r) = [001xxx] |
| t = r − 4 = 2 − 4 ≥ 0 ? No -> then | re-cod(r) = [0010xx] |
| t = r − 2 = 2 − 2 = 0 ≥ 0 ? Yes -> then r = t; | re-cod(r) = [00101x] |
| t = r − 1 = 0 − 1 ≥ 0 ? No -> then | re-cod(r) = [001010] | and the random number r=7 is re-coded in the base $B_{11}$ by:

$$\text{re-cod}(r) = \text{re-cod}(7) = 001010$$

by particularly indicating each bit of this re-coded number:

$$\text{re-cod}(7) = r_5 r_4 r_3 r_2 r_1 r_0 = 001010.$$

At this point, the first module C may carry out the first [r]P and second [m]P scalar multiplications (SCAL-MLT1r/m step 74) by simultaneously scanning the binary number $(11)_2$ from the left to the right and the re-coded number re-cod(7) from the right to the left.

Figure 4:
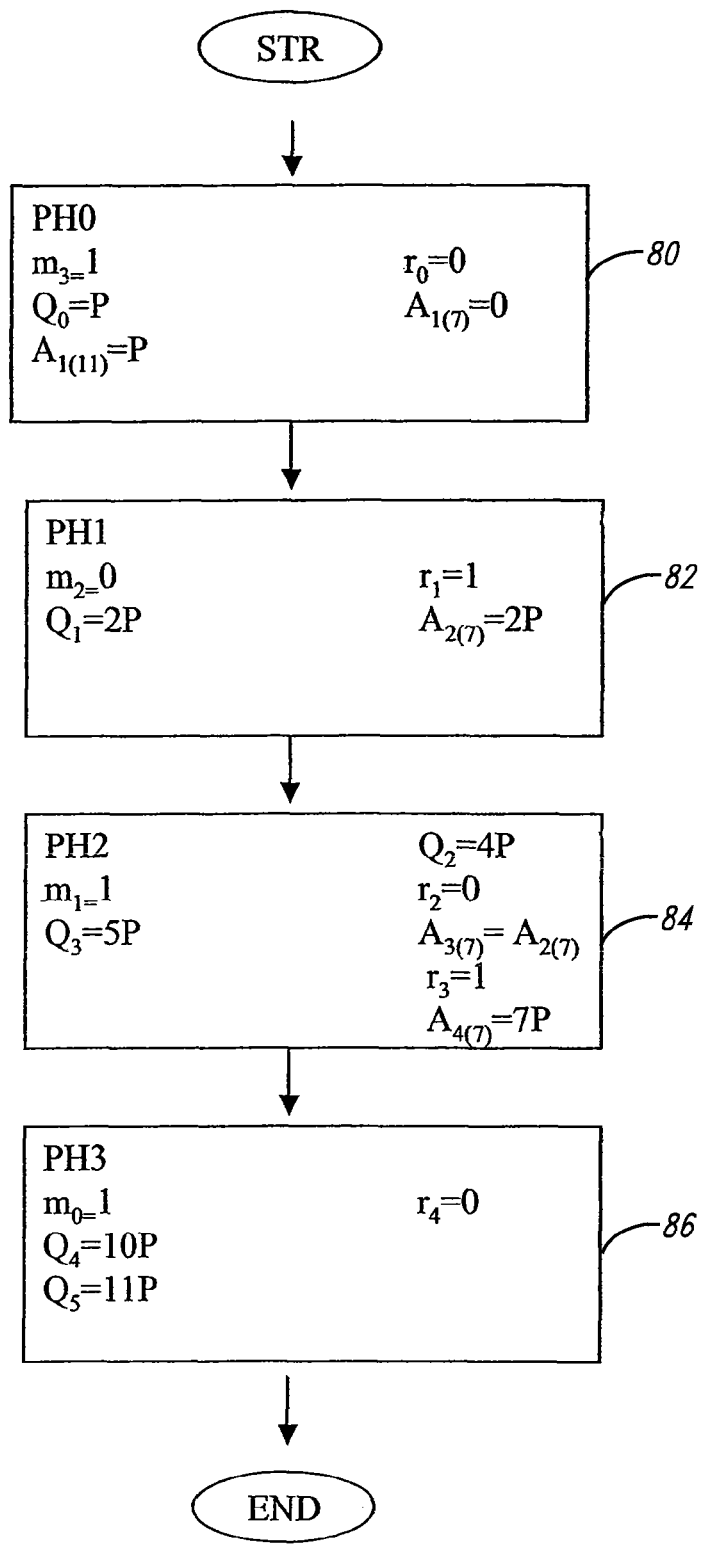
FIG. 4 schematically shows a flow diagram referring to steps of the further embodiment of the processing method from FIG. 3.

With reference to FIG. 4, a carrying out example of the SCAL-MLT1r/m step 74 has been described with a flow diagram.

Particularly, the first bit of the binary number $(11)_2$ (the bit $m_3$ in the examined example) is always equal to 1, at the first step of the scanning (PH0 step 80). The first module C values the first ordered factor $Q_0=P$ which coincides with the first partial sum:

$$A_{1(11)} = A_0 + Q_0 = P$$

($A_0=0$ traditionally) carried out for this binary number $(11)_2$.

On the other hand, the first bit of the number re-cod(7) is $r_0=0$, therefore, the corresponding first partial sum is not valued, i.e., $A_{1(7)}=0$.

The following step of the scanning (PH1 step 82), provides that the second ordered factor $Q_1=2Q_0=2P$ being obtained by doubling this first factor $Q_0$ may be generated. In this case, with $r_1=1$, the second partial sum referring to the number re-cod(7) is carried out from the partial sum being valued in the previous step (PH0 step 80), i.e.:

$$A_{2(7)} = A_{1(7)} + Q_1 = 2P$$

On the other hand, with $m_2=0$ the second partial sum referring to the number $(11)_2$ is not carried out.

In the subsequent step of the scanning (PH2 step 84), the first module C values the third ordered factor $Q_2=2Q_1=4P$. Given that $r_2=0$ the third partial sum for re-cod(7) (which is equal to the previous one, i.e., $A_{3(7)}=A_{2(7)}$) is not valued.

On the other hand, with $m_1=1$ the fourth ordered factor $Q_3=Q_2+P=5P$ is generated by increasing the third datum $Q_2$ by one unit.

The subsequent bit of the number re-cod(7) is $r_3=1$. From this factor $Q_3$, the partial sum is obtained:

$$A_{4(7)} = A_{3(7)} + Q_3 = 7P.$$

In the subsequent step of the scanning (PH3 step 86), the fifth ordered factor $Q_4=2Q_3=10P$ is valued. Given that the bit $r_4=0$ the partial sum for the number re-cod(7) which is equal to the one being valued in the previous step is not calculated.

On the other hand, with $m_0=1$, the sixth ordered factor $Q_5=Q_4+P=11P$ is valued. This factor $Q_5$ coincides with the last partial sum for the binary number $(11)_2$ and, particularly, with the final result of the second scalar multiplication [m]P. On the other hand, the last partial sum calculated for re-cod (7), i.e., $A_{4(7)}=7P$ coincides with the result of the first scalar multiplication [r]P.

It shall be noted that the cost in terms of computing for calculating the first [r]P and second [m]P multiplications can be expressed by:

$$\text{COST}_{[m]P + [r]P} = \lfloor \log_2 m \rfloor + hw(m) + hw(\text{re-cod}(r)) \quad (16)$$

wherein:
- $\lfloor \log_2 m \rfloor$ is the number of doubling operations required for calculating the ordered factors $Q_i$ from the first factor $Q_0$;
- $hw(m)$ is the number of partial sums calculated at the scanning of the second binary number $(m)_2$, i.e., the number of bits 1 being present in the second binary number $(m)_2$;

hw(re-cod(r)) indicates the number of partial sums calculated at the scanning of the re-coded number re-cod(r), i.e., the number of bits 1 being present in this number.

In accordance with the further embodiment of the method, the first module C may calculate the first scalar multiplication [r]P (through the scanning of the re-coded binary number re-cod(r) from the right to the left) and value the Tate's pairing <P,Q> by means of the Miller's algorithm (scanning of the binary number (m)$_2$ from the left to the right). In this case, the cost in terms of computing of this operation is:

$$\text{COST}_{<P,Q>+[r]P} = \lfloor \log_2 m \rfloor + hw(m) + hw(\text{re-cod}(r)) + \text{Cost} f_v \quad (17)$$

Finally, the first module C may also simultaneously value a multiplicity of Tate's pairing functions. For example, in the case of two pairing functions <P,R> and <P,Q>, the cost in terms of computing in order to calculate these functions by means of the Miller algorithm can be expressed by:

$$\text{COST}_{<P,Q>+<P,R>} = \lfloor \log_2 m \rfloor + hw(m) + \text{Cost} f_V + \text{Cost} f_W \quad (18)$$

It has been noted that the calculation of the pairing functions <P,R> and <P,Q> in accordance with the processing method described above, i.e., by using the same doubling operations, reduces the cost in terms of computing by about 50%.

Figure 3:
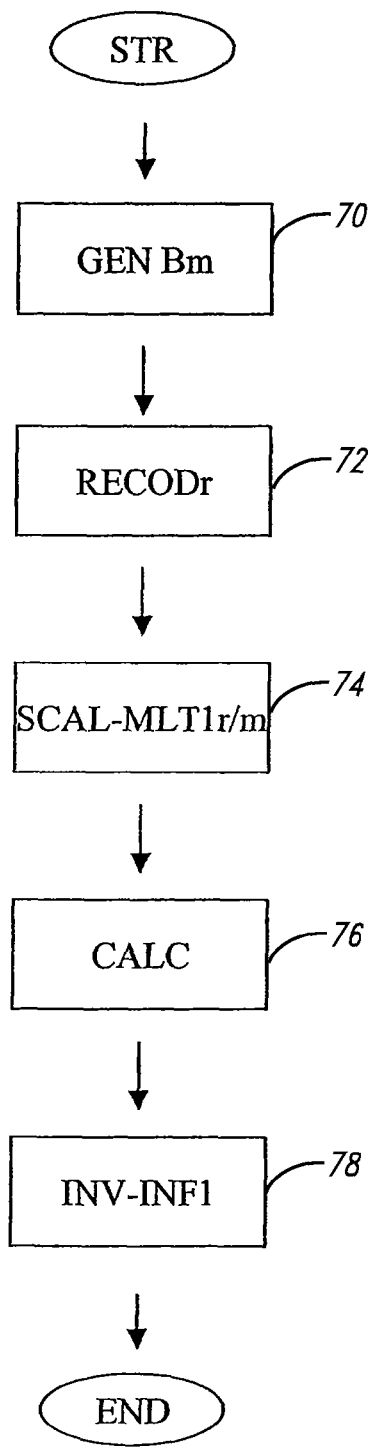
FIG. 3 schematically shows a flow diagram referring to a method for processing information according to another embodiment of the invention.

Finally, it shall be noted that with reference to FIG. 3, after the scalar multiplications have been carried out in accordance with the step SCAL-MLT1r/m, the processing method of the invention provides the encryption (CALC step 76) from the first module C of the information INFO to be transmitted by means of the calculated Tate's pairing function <P,Q>.

This encrypted information and the result of the first scalar multiplication [r]P are then sent from the first module C to the second D (INV-INF1 step 78).

APPENDIX

The listings of the programs referring to the known Double and Add algorithms (algorithm 1: scanning right→left and algorithm 2: scanning left→right) and the Miller's algorithms (algorithm 3: scanning right→left and algorithm 4: scanning left→right) are set forth herein below by way of example.

| Algorithm 1 |
|---|
| Input: t = ⌈log2 r⌉ r = (rt−1, ..., r0)2, rt−1 = 1 P<br>Output: [r]P<br>V := P;<br>for i = t−2 down to 0 do<br>    V := [2]V;<br>    if ri = 1 then<br>        V := V + P;<br>return V |

| Algorithm 2 |
|---|
| Input: t = ⌈log2 r⌉ r = (rt−1, ..., r0)2, P<br>Output: [r]P<br>V := P;<br>if (r0 = 1) then<br>    Z := P<br>    else Z := OE;<br>for i = 1 to t−1 do<br>    V := [2]V;<br>    if (ri = 1) then<br>        Z := Z + V;<br>return Z |

| Algorithm 3 |
|---|
| Input: t = ⌈log2 m⌉ m = (mt−1, ..., m0)2, mt−1 = m0 = 1<br>P, Q, q, k<br>Output: <P,Q> = fP(DQ)[(q^k −1)/m]<br>fV := 1;<br>V := P;<br>for i = t−2 down to 1 do<br>    Vnew := [2]V;<br>    fV := fV2 · gV,V(DQ) / g2V(DQ):<br>    V := Vnew;<br>    if (mi = 1) then<br>        Vnew := V+P;<br>    fV := fV · gV,P(DQ) / gV+P(DQ);<br>        V := Vnew;<br>fV := fV2 · gV,V(DQ) / g2V(DQ);<br>fV := fV[(q^k −1)/m];<br>return fV |

| Algorithm 4 |
|---|
| Input: t = ⌈log2 m⌉ m = (mt−1, ..., m0)2, mt−1 = m0 = 1<br>P, Q, q, k<br>Output: <P,Q> = fP(DQ)[(q^k −1)/m]<br>V = W := P;<br>fV = fW := 1;<br>for i = 1 to t−2 do<br>    Vnew := [2]V;<br>    fV := fV2 · gV,V(DQ) / g2V(DQ)<br>    V := Vnew;<br>    if (mi = 1) then<br>        Wnew := W+V;<br>        fW := fV · fW · gV,W(DQ) / gV+W(DQ)<br>        W := Wnew;<br>Vnew := [2]V;<br>fV := fV2 · gV,V(DQ) / g2V(DQ)<br>V := Vnew;<br>fW := fV · fW;<br>fW := fW[(q^k −1)/m];<br>return fW; |

Furthermore, the listings of examples for programs referring to the method for processing information described above (algorithm 5: scanning right→left for r and m), and the further embodiment of the method (algorithm 6 and algorithm 7: scanning right→left for re-cod(r) and scanning left→right for m) are shown herein below. Finally, the algorithm 8 relates to the simultaneous calculation of two pairing functions.

| Algorithm 5 |
|---|
| Input: t = ⌈log2 m⌉ m = (mt−1, ..., m0)2, mt−1 = m0 = 1<br>    s = ⌈log2 r⌉ r = (rs−1, ..., r0)2, rs−1 = r0 = 1<br>    P, Q, q, k<br>Output: [r]P, <P,Q> = fP(DQ)[(q^k −1)/m]<br>V = W = Z := P;<br>fV = fW :=1;<br>if (t−s > 0) then<br>    for i = s to t−1<br>        ri = 0;<br>for i = 1 to t−2 do<br>    Vnew = [2]V;<br>    fV := fV2 · gV,V(DQ) / g2V(DQ)<br>    V := Vnew;<br>    if (mi = 1) then<br>        Wnew := W+V;<br>        fW := fV · fW · gV,W(DQ) / gV+W(DQ); // fV · fW is a mult.<br>        in |

Algorithm 5

```
GF(qk)
       W := Wnew;
    if (ri = 1) then
          Z := Z+V;
fV := fV2 · gV,V(DQ) / g2V(DQ);
V := [2]V;
fW := fV · fW;
fW := fW[(q^k −1)/m];
if (rt−1 = 1)
Z := Z+V;
for i = t to s−1 do
    V := [2]V;
    if (ri = 1) then
          Z := Z+V;
return Z, fW;
```

Algorithm 6

```
Input: t = ⌈log2 m⌉ m = (mt−1, ..., m0)2, mt−1 = m0 = 1,
       w:= log2(m) + hw(m) −1 re-cod(r) = (cw−1, ...., c0)2
       P
Output: [r]P, [m]P
V := P;
if (c0 = 1)
    then Z = P;
       else Z = OE;
j = 1;                    // index of the scanner bit of re-cod(r)
for i = t − 2 down to 0 do    //index of the bit of m
    V = [2]V;
    if (cj = 1) then
    Z = Z + V;
    if (mi = 1) then
          j++
    V = V + P;
    if (cj−1 = 1) then
    Z = Z + V;
    j++
    if (cj = 1) then
    Z = Z + V;
return Z, V;
```

Algorithm 7

```
Input: t = ⌈log2 m⌉ m = (mt−1, ..., m0)2, mt−1 = m0 = 1
       re-cod(r) = (cw−1, ..., c0)2, P, Q, q, k,
Output: [r]P, <P,Q> = fP(DQ)[(q^k −1)/m]
fV := 1;
V := P;
if (c0= 1)
    then Z = P;
       else Z = OE;
j = 1;                    // j is the index of the re-cod(r) bit
for i = t−2 down to 1 do
begin
    Vnew := [2]V
    fV := fV2 · gV,V(DQ) / g2V(DQ);
       V := Vnew;
       if (cj = 1) then
    Z = Z + V;
    if (mi = 1) then
          j++
          Vnew := V + P;
          fV := fV · gV,P(DQ) / gV+P(DQ);
          V := Vnew;
    if (cj = 1) then
    Z = Z + V;
    j++
    if (cj = 1) then
    Z = Z + V;
``` fV := fV2 · gV,V(DQ) / g2V(DQ);
fV := fV[(q^k −1)/m];
return Z, fV

Algorithm 8

```
Input: t = ⌈log2 m⌉ m = (mt−1, ..., m0)2, mt−1 = m0 = 1
       P, Q, R, q, k,
Output: <P,Q> = fP(DQ)[(q^k −1)/m], <P,R> = fP(R)[(q^k −1)/m]
fV := fw := 1;
V := P;
for i = t−2 down to 1 do
    Vnew := [2]V
    fV := fV2 · gV,V(DQ) / g2V(DQ);
    fW := fW2 · gV,V(DR) / g2V(DR);
       V := Vnew;
    if (mi = 1) then
          Vnew := V + P;
          fV := fV · gV,P(DQ) / gV+P(DQ);
          fw := fw · gV,P(DR) / gV+P(DR);
          V := Vnew;
    fV := fV2 · gV,V(DQ) / g2V(DQ);
    fW := fW2 · gV,V(DR) / g2V(DR);
    fV := fV[(q^k −1)/m];
    fW := fW[(q^k −1)/m];
    return fV, fW
```

Obviously, aiming at satisfying contingent and specific needs, those skilled in the art will be able to carry out further modifications and variants, all of them being contemplated within the scope of protection of the invention, such as defined in the claims below.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method of processing information to be confidentially transmitted from a first module to a second module, said method comprising using at least one processing device configured to perform the steps of:
   iteratively carrying out a first scalar multiplication, using Tate's pairing function, between a point of an elliptical curve and a random integer generated by the first module in order to obtain a first result, said first scalar multiplication including:
       generating one of a plurality of ordered factors in each iteration; and
       calculating one of a plurality of first partial sums in each iteration based on the one of the plurality of ordered factors generated in a corresponding iteration;
   iteratively carrying out a second scalar multiplication, using Tate's pairing function, between the point of the elliptical curve and a positive integer indicative of an order of a point of the curve in order to obtain a second result, said second scalar multiplication including calculating one of a plurality of second partial sums in each iteration of the second scalar multiplication based on an ordered factor used in a corresponding iteration of the first scalar multiplication, wherein the first and second scalar multiplications comprise:

representing, from the first module, said random integer and said positive integer by sequences of bits in order to obtain a first and second binary numbers, respectively;

carrying out a simultaneous reading of a first bit of said first binary number and a first bit of said second binary number, said first bits being a least significant bit in their respective binary numbers;

verifying whether the first bits of the first and second binary numbers are a first logic value;

building the first and second partial sums in response to verifying that the first bits of the first and second binary numbers are the first logic value; and repeating the carrying out, verifying, and building steps for each bit of the first and second binary numbers; and processing said information based on the first and second results in order to obtain an encrypted information.

2. The method in accordance with claim 1 wherein generating the plurality of ordered factors includes generating a first ordered factor in a first iteration of the first scalar multiplication, and generating a subsequent, second ordered factor in a second iteration of the first scalar multiplication by doubling the first ordered factor, the first ordered factor being coincident with the point of the elliptical curve.

3. The method in accordance with claim 1, wherein the first and second modules are both electronic devices.

4. A method of processing information to be confidentially transmitted from a first module to a second module, said method comprising using at least one processing device configured to perform the steps of:

carrying out a first scalar multiplication, using Tate's pairing function, in order to obtain a first result, said first scalar multiplication including:
generating a plurality of ordered factors; and
calculating a plurality of first partial sums each based on a corresponding one of the ordered factors, respectively;

carrying out a second scalar multiplication, using Tate's pairing function, in order to obtain a second result, said second scalar multiplication including calculating a plurality of second partial sums each based on a corresponding one of the ordered factors, respectively; and processing said information based on the first and second results in order to obtain an encrypted information, wherein:

the second scalar multiplication is carried out between a point of an elliptical curve and a positive integer indicative of an order of a point of the elliptical curve and wherein the first scalar multiplication is carried out between the point and a random integer generated by the first module;

generating the plurality of ordered factors includes generating a first ordered factor, and generating a subsequent, second ordered factor by doubling the first ordered factor, the first ordered factor being coincident with the point of the elliptical curve; and the first and second scalar multiplications comprise the steps of:

representing, from the first module, said random integer and said positive integer by sequences of bits in order to obtain a first and second binary numbers, respectively;

carrying out a simultaneous reading of a first bit of said first binary number and a first bit of said second binary number, said first bits being a least significant bit in their respective binary numbers;

verifying whether the first bits of the first and second binary numbers are a first logic value;

building first and second partial sums in response to verifying that the first bits of the first and second binary numbers are the first logic value; and repeating the carrying out, verifying, and building steps for each bit of the first and second binary numbers.

5. The method in accordance with claim 4, wherein the first and second partial sums using the least significant bits of the first and second binary numbers coincide with said first ordered factor.

6. The method in accordance with claim 5 wherein the first and second partial sums for bits of the binary numbers following the least significant bits are calculated by adding an ordered factor to the partial sums for the least significant bits.

7. The method in accordance with claim 4, wherein said building step further comprises evaluating a first intermediate function referring to a pairing function.

8. The method in accordance with claim 4, having a cost in terms of computing equal to:

$$COST_{(P,Q)+[r]_P} = [\log_2 m] + hw(m) + hw(r) + COSTf_v$$

with:

$[\log_2 m]$ being a smallest integer included in the $\log_2 m$;

$hw(m)$ being a number of partial sums calculated from reading of the second binary number;

$hw(r)$ being a number of partial sums calculated from reading of the first binary number;

$COSTf_v$ being the cost in terms of computing for the verifying steps.

9. The method in accordance with claim 4, comprising the step of generating a dynamic numerical base from said second binary number, said dynamic numerical base being valued by an expression:

$$Bm = \{2^i \quad \text{with } 0 \leq i \leq N-1-d_{h-2}$$
$$2^i(2^{(N-1)-(d_{h-2})} + 1) \quad \text{with } 0 \leq i \leq d_{h-2} - d_{h-3}$$
$$2^i(2^{(d_{h-2})-(d_{h-3})}(2^{(N-1)-(d_{h-2})} + 1) + 1) \quad \text{with } 0 \leq i \leq d_{h-3} - d_{h-4}$$
$$\ldots$$
$$2^{d_1}(\ldots(2^{d_{h-3}-d_{h-2}}(2^{N-1-d_{h-2}} + 1) + 1)\ldots) + 1\}$$

said dynamic numerical base allowing a re-coding of the first binary number to be carried out in order to obtain a re-coded number.

10. The method in accordance with claim 9, further comprising carrying out further first and further second scalar multiplications by:

carrying out a simultaneous reading of one most significant bit of said second binary number and one least significant bit of said re-coded number;

generating a third ordered factor for said most significant bit read, said third ordered factor being equal to the point of the elliptical curve;

building a first partial sum for said most significant bit and a second partial sum for said least significant bit of said re-coded number following a verification that said most significant bit and said least significant bit of said re-coded number have the first logic value;

repeating the carrying out, generating, and building steps for each bit of the second binary number and the re-coded number, wherein repeating the generating step includes generating ordered factors subsequent to said third ordered factor either by adding the point of the elliptical curve to a previous one of the ordered factors or by doubling said previous ordered factor.

11. The method of claim 8 wherein hw(m) is a Hamming weight of the second binary number and hw(r) is a Hamming weight of the second binary number.

12. An electronic system for processing information to be confidentially transmitted from a first module to a second module, the system comprising:

a processor; and
a memory that stores instructions that, when executed by the processor, perform the steps of:
iteratively carrying out a first scalar multiplication, using Tate's pairing function, between a point of an elliptical curve and a random integer in order to obtain a first result, said first scalar multiplication including:
generating one of a plurality of ordered factors in each iteration of a plurality of respective iterations; and
calculating one of a plurality of first partial sums in each iteration based on the one of the plurality of ordered factors generated in a respective iteration of the plurality of iterations;
carrying out a second scalar multiplication, using Tate's pairing function, between the point of the elliptical curve and a positive integer indicative of an order of a point of the curve in order to obtain a second result, said second scalar multiplication including iteratively calculating a plurality of second partial sums each using the same ordered factor used in a respective iteration of the plurality of iterations, wherein the first and second scalar multiplications comprise:
representing, from the first module, said random integer and said positive integer by sequences of bits in order to obtain a first and second binary numbers, respectively;
carrying out a simultaneous reading of a first bit of said first binary number and a first bit of said second binary number, said first bits being a least significant bit in their respective binary numbers;
verifying whether the first bits of the first and second binary numbers are a first logic value;
building first and second partial sums in response to verifying that the first bits of the first and second binary numbers are the first logic value; and
repeating the carrying out, verifying, and building steps for each bit of the first and second binary numbers; and
processing said information based on the first and second results in order to obtain an encrypted information.

13. The electronic system of claim 12, wherein the step of generating includes generating a first ordered factor, and generating a subsequent, second ordered factor by doubling the first ordered factor, the first ordered factor being coincident with the point of the elliptical curve.

14. An electronic processing system configured to process information to be confidentially transmitted from a first module to a second module, the system comprising:
a processor; and
a memory that stores instructions that, when executed by the processor, perform the steps of:
carrying out a first scalar multiplication, using Tate's pairing function, in order to obtain a first result, said first scalar multiplication including:
generating a plurality of ordered factors; and
calculating a plurality of first partial sums each based on a corresponding one of the ordered factors, respectively;
carrying out a second scalar multiplication using Tate's pairing function in order to obtain a second result, said second scalar multiplication includes calculating a plurality of second partial sums each based on a corresponding one of the ordered factors, respectively; and
processing said information based on the first and second results in order to obtain an encrypted information, wherein:
the second scalar multiplication is carried out using Tate's pairing function, between a point of an elliptical curve and a positive integer indicative of an order of a point of the curve and wherein the first scalar multiplication is carried out between the point and a random integer generated by the first module;

the step of generating further generates a first ordered factor, and generates a subsequent, second ordered factor by doubling the first ordered factor, the first ordered factor being coincident with the point of the elliptical curve; and
the first and second scalar multiplication include:
representing said random integer and said positive integer by sequences of bits in order to obtain a first and second binary numbers, respectively;
carrying out a simultaneous reading of a first bit of said first binary number and a first bit of said second binary number, said first bits being a least significant bit in their respective binary numbers;
verifying whether the first bits of the first and second binary numbers are a first logic value;
building first and second partial sums in response to verifying that the first bits of the first and second binary numbers are the first logic value; and
repeating the carrying out, verifying, and building for each bit of the first and second binary numbers.

15. The electronic processing system of claim 14 wherein the first and second partial sums using the least significant bits of the first and second binary numbers coincide with said first ordered factor.

16. The electronic processing system of claim 15 wherein the first and second partial sums for bits of the binary numbers following the least significant bits are calculated by adding an ordered factor to the partial sums for the least significant bits.

17. The electronic processing system of claim 14 comprising generating a dynamic numerical base from said second binary number, said dynamic numerical base being valued by an expression:

$$Bm = \{2^i \quad \text{with } 0 \le i \le N - 1 - d_{h-2}$$
$$2^i(2^{(N-1)-(d_{h-2})} + 1) \quad \text{with } 0 \le i \le d_{h-2} - d_{h-3}$$
$$2^i(2^{(d_{h-2})-(d_{h-3})}(2^{(N-1)-(d_{h-2})} + 1) + 1) \quad \text{with } 0 \le i \le d_{h-3} - d_{h-4}$$
$$\ldots$$
$$2^{d_1}(\ldots(2^{d_{h-3}-d_{h-2}}(2^{N-1-d_{h-2}} + 1) + 1)\ldots) + 1\}$$

said dynamic numerical base allowing a re-coding of the first binary number to be carried out in order to obtain a re-coded number.

18. The electronic processing system of claim 17, further comprising carrying out further first and further second scalar multiplications by:
carrying out a simultaneous reading of one most significant bit of said second binary number and one least significant bit of said re-coded number;
generating a third ordered factor for said most significant bit read, said third ordered factor being equal to the point of the elliptical curve;
building a first partial sum for said most significant bit and the second partial sum for said least significant bit of said re-coded number following a verification that said most significant bit and said least significant bit of said re-coded number have the first logic value; and
repeating the carrying out, generating, and building steps for each bit of the second binary number and the re-coded number, wherein repeating the generating step includes generating ordered factors subsequent to said third ordered factor either by adding the point of the elliptical curve to a previous one of the ordered factors or by doubling said previous ordered factor.

19. A non-transitory computer-readable medium, comprising code that, when loaded into a memory of a computer, causes the computer to process information to be confidentially transmitted from a first module to a second by a method that includes:

carrying out a first iterative scalar multiplication, using Tate's pairing function, between a point of an elliptical curve and a random integer generated by the first module in order to obtain a first result, said first scalar multiplication including:
generating in a first iteration a first of a plurality of ordered factors;
calculating in the first iteration one of a plurality of first partial sums, based on a corresponding ordered factor generated in the first iteration;
generating a second one of the plurality of ordered factors and a second one of the plurality of first partial sums in a subsequent iteration;
carrying out a second iterative scalar multiplication, using Tate's pairing function, between the point of the elliptical curve and a positive integer indicative of an order of a point of the elliptical curve in order to obtain a second result, said second scalar multiplication including calculating a plurality of second partial sums, each based on the same ordered factor used in a respective iteration of the first scalar multiplication, wherein the first and second scalar multiplications comprise:
representing, from the first module, said random integer and said positive integer by sequences of bits in order to obtain a first and second binary numbers, respectively;
carrying out a simultaneous reading of a first bit of said first binary number and a first bit of said second binary number, said first bits being a least significant bit in their respective binary numbers;
verifying whether the first bits of the first and second binary numbers are a first logic value;
building first and second partial sums in response to verifying that the first bits of the first and second binary numbers are the first logic value; and
repeating the carrying out, verifying, and building steps for each bit of the first and second binary numbers; and
processing said information based on the first and second results in order to obtain an encrypted information.

20. The non-transitory computer-readable medium of claim 19 wherein generating the second ordered factor comprises doubling the first ordered factor, the first ordered factor being coincident with the point of the elliptical curve.

21. A non-transitory computer-readable medium, comprising code that, when loaded into a memory of a computer, causes the computer to process information to be confidentially transmitted from a first module to a second module by a method that includes:
carrying out a first scalar multiplication, using Tate's pairing function, in order to obtain a first result, said first scalar multiplication including:
generating a plurality of ordered factors; and
calculating a plurality of first partial sums each based on a corresponding one of the ordered factors, respectively;
carrying out a second scalar multiplication, using Tate's pairing function, in order to obtain a second result, said second scalar multiplication including calculating a plurality of second partial sums each based on a corresponding one of the ordered factors, respectively; and
processing said information based on the first and second results in order to obtain an encrypted information, wherein:
the second scalar multiplication is carried out between a point of an elliptical curve and a positive integer indicative of an order of a point of the elliptical curve and wherein the first scalar multiplication is carried out between the point and a random integer generated by the first module;
generating the plurality of ordered factors includes generating a first ordered factor, and generating a subsequent, second ordered factor by doubling the first ordered factor, the first ordered factor being coincident with the point of the elliptical curve; and
the first and second scalar multiplications comprise the steps of:
representing, from the first module, said random integer and said positive integer by sequences of bits in order to obtain a first and second binary numbers, respectively;
carrying out a simultaneous reading of a first bit of said first binary number and a first bit of said second binary number, said first bits being a least significant bit in their respective binary numbers;
verifying whether the first bits of the first and second binary numbers are a first logic value;
building first and second partial sums in response to verifying that the first bits of the first and second binary numbers are the first logic value; and
repeating the carrying out, verifying, and building steps for each bit of the first and second binary numbers.

22. The non-transitory computer-readable medium of claim 21, wherein the first and second partial sums using the least significant bits of the first and second binary numbers coincide with said first ordered factor.

23. The non-transitory computer-readable medium of claim 22, wherein the first and second partial sums for bits of the binary numbers following the least significant bits are calculated by adding an ordered factor to the partial sums for the least significant bits.

24. The non-transitory computer-readable medium of claim 21, wherein the method includes generating a dynamic numerical base from said second binary number, said dynamic numerical base being valued by an expression:

$$B_m = \{2^i \quad \text{with } 0 \leq i \leq N-1-d_{h-2}$$
$$2^i(2^{(N-1)-(d_{h-2})}+1) \quad \text{with } 0 \leq i \leq d_{h-2}-d_{h-3}$$
$$2^i(2^{(d_{h-2})-(d_{h-3})}(2^{(N-1)-(d_{h-2})}+1)+1) \quad \text{with } 0 \leq i \leq d_{h-3}-d_{h-4}$$
$$\ldots$$
$$2^{d_1}(\ldots(2^{d_{h-3}-d_{h-2}}(2^{N-1-d_{h-2}}+1)+1)\ldots)+1\}$$

said dynamic numerical base allowing a re-coding of the first binary number to be carried out in order to obtain a re-coded number.

25. The non-transitory computer-readable medium of claim 24, wherein the method includes carrying out further first and further second scalar multiplications by:
carrying out a simultaneous reading of one most significant bit of said second binary number and one least significant bit of said re-coded number;
generating a third ordered factor for said most significant bit read, said third ordered factor being equal to the point of the elliptical curve;
building a first partial sum for said most significant bit and a second partial sum for said least significant bit of said re-coded number following a verification that said most significant bit and said least significant bit of said re-coded number have the first logic value;
repeating the carrying out, generating, and building steps for each bit of the second binary number and the re-coded number, wherein repeating the generating step includes generating ordered factors subsequent to said third ordered factor either by adding the point of the elliptical curve to a previous one of the ordered factors or by doubling said previous ordered factor.

* * * * *